(12) United States Patent
Dannoux et al.

(10) Patent No.: US 10,336,643 B2
(45) Date of Patent: Jul. 2, 2019

(54) GLASS SHAPING APPARATUS AND METHODS

(71) Applicant: CORNING INCORPORATED, Corning, NY (US)

(72) Inventors: Thierry Luc Alain Dannoux, Avon (FR); Paul Louis Florent Delautre, Lisses (FR); Michele Marie-Louise Fredholm, Vulaines sur Seine (FR); Stephane Poissy, Brunoy (FR); Ronan Tanguy, Grez sur Loing (FR); Claude Jacques Julien Vanotti, Ponthierry Saint Fargeau (FR)

(73) Assignee: CORNING INCORPORATED, Corning, NY (US)

( * ) Notice: Subject to any disclaimer, the term of this patent is extended or adjusted under 35 U.S.C. 154(b) by 105 days.

(21) Appl. No.: 15/329,710

(22) PCT Filed: Jul. 31, 2015

(86) PCT No.: PCT/US2015/043032
§ 371 (c)(1),
(2) Date: Jan. 27, 2017

(87) PCT Pub. No.: WO2016/019209
PCT Pub. Date: Feb. 4, 2016

(65) Prior Publication Data
US 2017/0210661 A1 Jul. 27, 2017

Related U.S. Application Data

(60) Provisional application No. 62/032,100, filed on Aug. 1, 2014.

(51) Int. Cl.
*C03B 23/025* (2006.01)
*C03B 23/035* (2006.01)
(Continued)

(52) U.S. Cl.
CPC ...... *C03B 23/0252* (2013.01); *C03B 23/0256* (2013.01); *C03B 23/03* (2013.01);
(Continued)

(58) Field of Classification Search
CPC .............. C03B 23/0252; C03B 23/025; C03B 23/0256
See application file for complete search history.

(56) References Cited

U.S. PATENT DOCUMENTS 2,021,180 A * 11/1935 Galey ................. C03B 23/0252
65/287
2,327,883 A * 8/1943 Galey .................... B01D 45/14
65/173
(Continued)

FOREIGN PATENT DOCUMENTS

CN 202576209 12/2012
DE 2543130 4/1976
(Continued)

OTHER PUBLICATIONS

EP-2679550 English language machine translation accessed at ESP@CENET on Jun. 22, 2018.*
(Continued)

*Primary Examiner* — Jason L Lazorcik

(57) ABSTRACT

Disclosed are apparatuses for shaping a glass structure, the apparatuses having a plurality of rib members, each rib member comprising at least one void and at least one shaping edge; and at least one support member. The apparatuses can further comprise a shaping member and/or a guide member and/or a shaping groove. Also disclosed herein are methods for shaping a glass structure, the methods comprising positioning the glass structure on a shaping apparatus and heating the glass structure to shape the glass structure.

17 Claims, 5 Drawing Sheets

(51) Int. Cl.
*C03B 40/00* (2006.01)
*C03B 23/03* (2006.01)

(52) U.S. Cl.
CPC ........ *C03B 23/035* (2013.01); *C03B 23/0357* (2013.01); *C03B 40/005* (2013.01); *Y02P 40/57* (2015.11)

(56) References Cited

U.S. PATENT DOCUMENTS

| | | | | |
|---|---|---|---|---|
| 2,550,252 | A * | 4/1951 | Jendrisak | C03B 23/0252 100/295 |
| 2,663,974 | A | 12/1953 | Thomson | |
| 2,758,422 | A * | 8/1956 | Jendrisak | C03B 23/0252 65/289 |
| 2,943,420 | A * | 7/1960 | Kostic | C03B 23/0252 65/287 |
| 3,253,899 | A * | 5/1966 | McMaster | C03B 23/0252 65/107 |
| 3,484,226 | A * | 12/1969 | Golightly | C03B 23/0252 211/184 |
| 3,756,797 | A * | 9/1973 | Akeyoshi et al. | C03B 23/0252 65/107 |
| 4,018,589 | A * | 4/1977 | Egbert | C03B 23/0252 65/287 |
| 4,268,332 | A * | 5/1981 | Winders | B23P 15/00 126/569 |
| 4,661,142 | A | 4/1987 | Bartusel et al. | |
| 4,684,388 | A | 8/1987 | Boaz | |
| 4,865,639 | A | 9/1989 | Kduo | |
| 4,897,102 | A * | 1/1990 | Modesitt | C03B 23/03 65/104 |
| 4,906,271 | A * | 3/1990 | D'Iribarne | C03B 23/0252 65/273 |
| 5,441,551 | A | 8/1995 | Ollfisch et al. | |
| 5,834,283 | A | 11/1998 | Frebourg et al. | |
| 6,045,926 | A | 4/2000 | Van De Velde et al. | |
| 6,158,247 | A | 12/2000 | Didelot | |
| 6,357,263 | B1 | 3/2002 | Yajima et al. | |
| 6,756,330 | B1 | 6/2004 | Heirbaut et al. | |
| 7,437,892 | B2 * | 10/2008 | Siskos | C03B 23/0252 65/106 |
| 7,707,853 | B2 | 5/2010 | Schroeder et al. | |
| 8,528,366 | B2 | 9/2013 | Berrada Sounni et al. | |
| 8,549,885 | B2 | 10/2013 | Dannoux et al. | |
| 8,604,333 | B2 * | 12/2013 | Angel | C03B 23/0256 136/246 |
| 8,986,072 | B2 | 3/2015 | Darcangelo et al. | |
| 9,010,153 | B2 | 4/2015 | Ukrainczyk et al. | |
| 9,284,212 | B2 | 3/2016 | Dannoux et al. | |
| 2003/0106341 | A1 | 6/2003 | Hanada et al. | |
| 2003/0159470 | A1 * | 8/2003 | Park | C03B 23/0252 65/291 |
| 2010/0147030 | A1 * | 6/2010 | Rietbergen | C03B 23/0252 65/106 |
| 2012/0094084 | A1 | 4/2012 | Fisher et al. | |
| 2012/0328843 | A1 | 12/2012 | Cleary et al. | |
| 2013/0000356 | A1 * | 1/2013 | Judkins | C03B 23/0252 65/105 |
| 2013/0086948 | A1 | 4/2013 | Bisson et al. | |
| 2013/0125589 | A1 | 5/2013 | Dannoux et al. | |
| 2013/0125592 | A1 | 5/2013 | Bisson | |
| 2013/0127202 | A1 | 5/2013 | Hart | |
| 2013/0160495 | A1 * | 6/2013 | Berrada Sounni | C03B 40/005 65/273 |
| 2013/0255322 | A1 | 10/2013 | Yli-Vakkuri et al. | |
| 2013/0295357 | A1 | 11/2013 | Cleary et al. | |
| 2013/0319046 | A1 | 12/2013 | Cleary et al. | |
| 2013/0323415 | A1 | 12/2013 | Brackley et al. | |
| 2013/0329346 | A1 | 12/2013 | Dannoux et al. | |
| 2014/0087159 | A1 | 3/2014 | Cleary et al. | |
| 2014/0087193 | A1 | 3/2014 | Cites et al. | |
| 2014/0141217 | A1 | 5/2014 | Gulati et al. | |
| 2014/0239034 | A1 | 8/2014 | Cleary et al. | |
| 2014/0356604 | A1 | 12/2014 | Borrelli et al. | |
| 2015/0064374 | A1 | 3/2015 | Jain et al. | |
| 2015/0111016 | A1 | 4/2015 | Fisher et al. | |
| 2015/0122406 | A1 | 5/2015 | Fisher et al. | |
| 2015/0132538 | A1 | 5/2015 | Cleary et al. | |
| 2015/0140301 | A1 | 5/2015 | Fisher et al. | |
| 2015/0158275 | A1 | 6/2015 | D'Errico et al. | |
| 2015/0158277 | A1 | 6/2015 | Fisher et al. | |
| 2015/0232366 | A1 | 8/2015 | Fredholm et al. | |
| 2015/0232367 | A1 | 8/2015 | Joubaud et al. | |
| 2015/0251377 | A1 | 9/2015 | Cleary et al. | |
| 2015/0274571 | A1 | 10/2015 | Brennan et al. | |
| 2015/0321940 | A1 | 11/2015 | Dannoux et al. | |
| 2016/0082705 | A1 | 3/2016 | Fisher et al. | |
| 2016/0145139 | A1 * | 5/2016 | Fredholm | C03B 23/0235 65/29.1 |
| 2016/0145140 | A1 * | 5/2016 | Szarejko | C03B 23/0252 65/287 |
| 2016/0207290 | A1 | 7/2016 | Cleary et al. | |
| 2016/0207819 | A1 | 7/2016 | Cleary et al. | |
| 2016/0207820 | A1 | 7/2016 | Cleary et al. | |
| 2016/0250825 | A1 | 9/2016 | Cleary et al. | |
| 2017/0210661 | A1 * | 7/2017 | Dannoux | C03B 40/005 |
| 2018/0072607 | A1 * | 3/2018 | Fujii | C03B 25/025 |

FOREIGN PATENT DOCUMENTS

| | | | |
|---|---|---|---|
| DE | 102012107968 | 3/2014 | |
| EP | 2679550 A1 * | 1/2014 | ......... C03B 23/0252 |
| FR | 2543130 | 9/1984 | |
| GB | 04680 | 12/1909 | |
| GB | 2320021 A | 6/1998 | |
| WO | 2009002158 | 12/2008 | |
| WO | 2011029852 | 3/2011 | |
| WO | 2014001316 | 1/2014 | |
| WO | 2014001316 A1 | 1/2014 | |

OTHER PUBLICATIONS

International Search Report and Written Opinion of the International Searching Authority; PCT/US2015/043032; dated Oct. 19, 2015.

* cited by examiner

GLASS SHAPING APPARATUS AND METHODS

CROSS-REFERENCE TO RELATED APPLICATIONS

This application claims the benefit of priority under 35 U.S.C. § 365 of International Patent Application Serial No. PCT/US15/43032 filed on Jul. 31, 2015, which also claims the benefit of priority under 35 U.S.C. § 119 of U.S. Provisional Application Ser. No. 62/032,100 filed on Aug. 1, 2014 the content of which is relied upon and incorporated herein by reference in its entirety.

FIELD OF THE DISCLOSURE

The disclosure relates generally to apparatuses and methods for shaping glass structures.

BACKGROUND

The ability to thermally shape and form glass sheets is increasingly relevant to various industries, such as the automotive industry. Production of glass structures is a complex process, which is constantly changing due to increasingly stringent environmental and safety requirements. Demand for intricate glass shapes with high optical quality and low weight is growing, for example in the automotive industry as governmental regulations require increased fuel economy and reduced emissions. The ability to make automotive parts, such as for automotive interior decorations and screens, from thinner glasses may translate to lower vehicle weight, improved fuel economy, reduced emissions, and/or improved vehicle weight distribution (e.g., lower center of gravity).

Thermal shaping of glass structures may also be applicable for other products, such as architectural glasses and glass covers for electronics such as televisions, computers, watches, smart phones, and other display devices. Growing consumer demand for thinner devices with higher optical precision and lower cost can drive the need for cost-effective methods and apparatuses for making high precision thin glass shapes.

Prior art methods for shaping glass include placing glass sheets on a shaping mold, conveying the glass through a furnace or lehr to uniformly heat and soften the sheets, and allowing the softened glass to sag under gravity to assume a desired shape. The shaping mold serves as a surface around which the glass sheet can be formed to the desired shape. Various shaping molds are available for shaping glass structures, such as molds machined from bulk stainless steel or ceramic materials, welded beam molds, and rolled metal sheet surface molds. Machined molds have the advantage of high precision (e.g., as low as about 0.1 mm), but have the drawback of increased expense. Welded beam molds and rolled metal sheet molds are lower in cost, but are not as precise as machined molds, typically providing precision in the range of 1-2 mm.

Accordingly, it would be advantageous to provide apparatuses and methods for shaping and tempering glass structures that provide improved precision and/or accuracy, while at the same time being cost-effective. To reduce manufacturing costs and/or processing times, it would additionally be advantageous to provide an apparatus that can function, at least in part, in conjunction with existing systems for bending and tempering glass structures.

SUMMARY

The disclosure relates, in various embodiments, to apparatuses for shaping glass structures for providing developable shapes and shapes with multidirectional local radii of curvatures. Apparatuses for shaping glass structures according to various embodiments of the disclosure comprise a plurality of rib members, one or more rib member comprising at least one void and at least one shaping edge; at least one support member; and at least one shaping member having at least one curvature that matches a curvature of at least one shaping edge. In various embodiments, the shaping member may be positioned on the plurality of rib members and substantially conform to the shape of the non-planar surface of the plurality of rib members.

In further embodiments the disclosure relates to apparatuses for shaping glass structures comprise a plurality of guide members, one or more guide members comprising at least one void, at least one shaping edge, and at least one shaping groove; at least one support member connecting at least two guide members, and a shaping member having at least one curvature that matches a curvature of at least one shaping groove. In various embodiments, at least one guide member may comprise at least two shaping edges defining the shaping groove, and the shaping groove may be configured to bias the support member with respect to one or more shaping edges.

The disclosure also relates to methods for shaping a glass structure comprising positioning the glass structure on a shaping apparatus as described herein and heating the glass structure. In various embodiments, the glass structure is heated to a temperature ranging from about 300° C. to about 1600° C., with a heating time ranging from about 1 minute to about 60 minutes or more, such as up to 2 hours, up to 3 hours, up to 4 hours, up to 6 hours, up to 12 hours, up to 24 hours, or more. According to certain non-limiting embodiments, the glass structure may have a thickness of less than about 20 mm, such as ranging from about 0.1 mm to about 10 mm, from about 0.3 mm to about 5 mm, or from about 0.7 mm to about 1.5 mm. In various embodiments, the methods for shaping may comprise gravity sagging, optionally in conjunction with vacuum or dead load weight assistance.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be best understood when read in conjunction with the following drawings, where like structures are indicated with like reference numerals and in which.

DETAILED DESCRIPTION

Apparatuses

Disclosed herein are apparatuses, e.g. molds, for shaping or bending a glass structure comprising a plurality of rib members, each of the rib members comprising a plurality of voids and at least one shaping edge; and a plurality of support members extending through at least a portion of the plurality of voids in a direction transverse to a vertical axis of the plurality of rib members, wherein the shaping edges of two or more of the rib members collectively form a non-planar surface. According to various embodiments, the apparatus can further comprise a shaping member positioned on the plurality of rib members and substantially conforming to the non-planar surface of the plurality of rib members.

The terms "apparatus," "shaping apparatus," "mold," and "shaping mold" can be used interchangeably herein to refer to similar devices for shaping a glass structure and such use should not limit the scope of the claims appended herewith.

Further, the "non-planar surface" as defined herein is understood to mean a surface that is not completely flat, although the surface may comprise some discrete portions that are planar or substantially planar.

Figure 1:
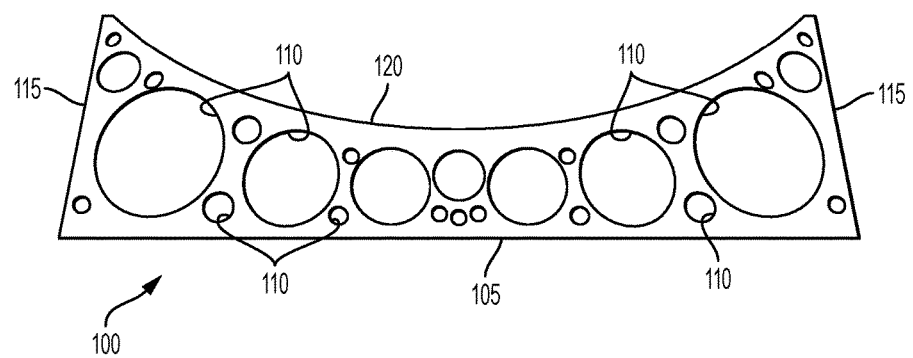
FIG. 1 is a graphical illustration of an exemplary rib member according to various embodiments of the disclosure.

With reference to FIG. 1, a non-limiting embodiment of a rib member 100 is illustrated, which comprises a plurality of voids (e.g. through-holes) 110 and a shaping edge 120. The rib member may also comprise one or more additional edges, such as a lower edge 105 and side edges 115. FIG. 1 illustrates one exemplary embodiment of a rib member; however, various other configurations are envisioned and are intended to fall within the scope of the disclosure, including voids of different shapes, sizes, locations, and number, as well as different shapes for the rib member and/or its shaping edge. The shaping edge 120 of the rib member can have any suitable shape for shaping a glass structure, such as a parabolic or semi-circular shape, or an irregular shape, just to name a few. Further, the rib members in a given shaping apparatus may all have the same shape and/or size, or may have varying shapes and/or sizes, depending on the desired glass shape. The shaping edges of each rib member may also be identical throughout the mold or may vary as desired to produce a target glass shape.

The plurality of voids 110 can be of any shape, number, and size. The voids may all be identical in shape and/or size, or may vary in shape and/or size. According to various embodiments, the voids may have a substantially circular, oval, triangular, rectangular, trapezoidal, rhombus, or square shape, for example, although any other suitable shape can be used and is envisioned to fall within the scope of the disclosure. The voids can, in certain embodiments, have a size, such as a diameter, width, and/or height, ranging from about 1 mm to about 500 mm, such as from about 5 mm to about 250 mm, or from about 10 mm to about 70 mm, including all ranges and subranges therebetween. Of course, these dimensions are exemplary only and should not limit the scope of the claims appended herewith.

In various embodiments, the plurality of voids 110 may comprise up to about 95% of the total surface area of the rib member 100, for example, from about 30% to about 90%, from about 40% to about 80%, or from about 50% to about 70%, including all ranges and subrange therebetween. Without wishing to be bound by theory, it is believed that the inclusion of voids in the rib members may increase throughput and lighten overall weight of the mold structure. The addition of voids, e.g., the removal of rib member material, may also, in certain embodiments, lower the thermal inertia of a respective rib member such that the glass structure can be shaped and processed using a shorter cycle time. Thus, in various embodiments, the voids are through-holes in the rib members, i.e. they form a hole through the entire thickness of the rib member. It may be possible in alternate embodiments for the voids to not be through-holes, i.e. they may form a hole through only a portion of the thickness of the rib member.

According to various non-limiting embodiments, each rib member may have a thickness ranging, for example, from about 0.1 mm to about 5 mm, such as from about 0.2 mm to about 4 mm, from about 0.5 mm to about 3 mm, or from about 1 mm to about 2 mm, including all ranges and subranges therebetween. The rib members in a given shaping apparatus may all have the same thickness, or may have varying thicknesses, such as within each rib and/or from rib to rib.

The rib members may be constructed by any means and from any suitable material. According to various embodiments, the rib members may be formed using electromagnetic discharge, laser, or water jet cutting, or may be molded. In various embodiments, metals such as such as steel, cold rolled steel, aluminum, or any other suitable metal. In one exemplary and non-limiting embodiment, the rib members may be comprised of AISI 310 stainless steel. Materials other than metal are also envisioned. In certain embodiments, the rib member may be a metal sheet or shim which can, for example, be molded or laser cut to the desired shape and size. The voids in the rib member can likewise be produced according to the aforementioned methods, or by any other method known in the art. According to various embodiments, a laser, water-jet, or other suitable cutting mechanism may be employed to cut the rib members, resulting in a shape repeatability (precision) of approximately 0.2 mm, or about 0.1 mm, or less. For example, if a 300 mm radius glass part is intended to be made, the obtained shape can be within at least about 0.1 mm of the target size. In the case of a plurality of rib members, the precision may be increased even further, for example, to within at least about 0.05 mm of the target size, or even to within at least about 0.01 mm of the target size. In other embodiments, the rib members may be machined which can also provide acceptable shape repeatability. In exemplary embodiments where the rib members comprise more than one component, the components may be formed of the same type of material or of different materials.

According to some embodiments, an angle α, formed between the lower edge 105 and the side edge 115 may vary according to a particular application of the rib member 100. For example, angle α may range from about 70° to about 110°. In some embodiments, angle α may be about 90°.

Optionally, two or more rib members 100 may be used in a shaping apparatus 200 as a frame or as guide members 101, for example for supporting other rib members 100 and/or for guiding a shaping member, such as discussed below with regard to FIG. 2.

Figure 2:
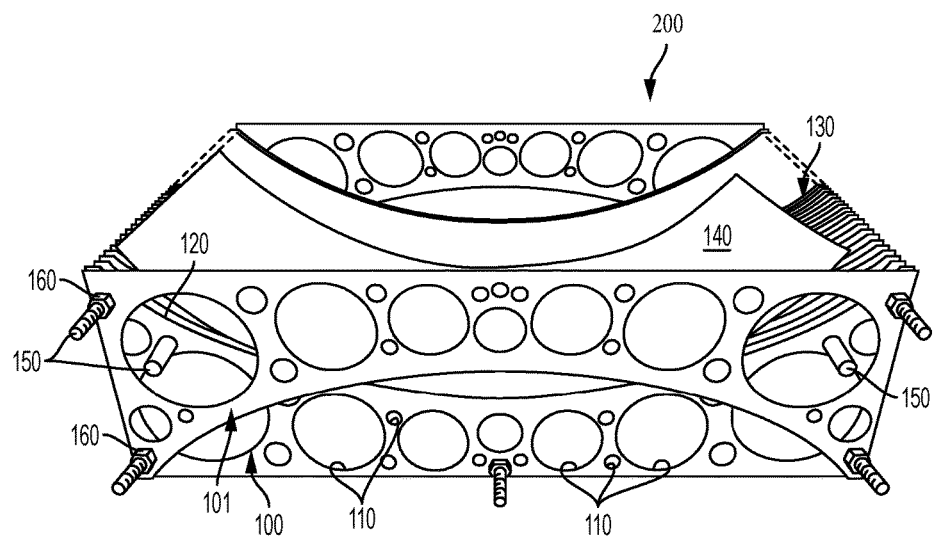
FIG. 2 is a side view of an exemplary shaping apparatus according to various embodiments of the disclosure.

FIG. 2 depicts a perspective view of a shaping apparatus 200 comprising a plurality of rib members 100, according to exemplary embodiments of the disclosure. Referring to FIG. 2, the shaping apparatus 200 includes an array of rib members 100. One or more rib members 100 may include one or a plurality of voids 110 and a shaping edge 120. The rib members 100 can be arranged such that the shaping edges 120 collectively form a non-planar surface 130. The rib members 100 may be configured to support a shaping member 140. In various embodiments, the shaping member 140 may be positioned on the non-planar surface 130 and may optionally substantially conform to the shape of the non-planar surface 130. The shaping apparatus 200 may also include guide members 101 disposed on opposing sides of the array of rib members 100. The guide members 101 may optionally be rib members, for example that are inverted with respect to the remaining rib members 100. According to some embodiments, the guide members 101 may operate to align the shaping member 140 on the shaping edge 120 of the plurality of rib members 100.

One or more support members 150 can extend between one or more ribs in the plurality of ribs, or may extend through at least a portion of the plurality of voids 110, optionally in a direction substantially transverse to the vertical axis of the array of rib members 100. According to various embodiments, the support members 150 and rib members 100 can be secured in place using one or more fastening members 160. Furthermore, as illustrated in the elevated view depicted in FIG. 3, one or more spacers 170 may optionally be disposed between one or more of the rib members 100.

The non-planar surface 130 may be comprised of a plurality of shaping edges 120, and may have any desired shape, for example, non-planar shapes such as semi-circular, parabolic, hyperbolic, conical, semi-conical, toroidal, semi-toroidal, hyperboloid, frusto-coninical, or other shapes having a non-constant radius. The non-planar surface 130 can be formed by at least two rib members 100, such as by at least three rib members, at least four rib members, at least five rib members, and so on, without limit. In certain embodiments, the shaping mold can be larger than the glass structure to be shaped, in which case one or more of the rib members may or may not form the non-planar surface and may or may not be part of the portion of the non-planar surface used for shaping the glass structure. According to further exemplary embodiments, the non-planar surface can be used to shape a single glass structure, or multiple glass structures, such as two or more structures, three or more structures, four or more structures, and so on. For instance, the non-planar surface can comprise two or more identical or different portions which can be used to shape two or more identical or different glass structures.

The shaping member 140 can, in various embodiments, be disposed or positioned on or proximate one or more of the shaping edges 120 or the non-planar surface 130, and can be configured to substantially conform to, or take the shape of, the non-planar surface. By "disposed or positioned on or proximate" one or more shaping edges or the non-planar surface, it is intended that in at least certain embodiments, the shaping member is resting on and/or touching one or more shaping edges or the non-planar surface. For example, the shaping member can freely rest on the one or more shaping edges or the non-planar surface, or can be coupled to the apparatus by a mechanism, such as a clip or fastener. According to some embodiments, the guide members 101 may be configured to secure or align the shaping member on or near the non-planar surface 130. The shaping member can, in some embodiments, be sized and positioned to completely or substantially cover the non-planar surface or to partially cover the non-planar surface, or in other embodiments may be sized and positioned to be disposed between one or more rib members 100, such as between two guide members 101. During the glass bending process, a glass sheet, which may, for example, be substantially planar before the bending process, can be placed on the shaping member and, after the application of heat for an appropriate period of time as discussed in more detail below, can sag or be pressed, for example, to take the shape of the shaping member.

The shaping member can be constructed from any suitable material, for example, foils, fabrics, or papers comprising metal, glass, and/or ceramic, and combinations thereof. In various embodiments, the shaping member can be chosen from stainless steel foils, fabrics, or papers. It may, in various embodiments, be desirable to choose a material that is chemically stable at glass-molding temperatures. In certain exemplary and non-limiting embodiments, the shaping member may be formed of a malleable material, such as a metal or alloy that is substantially non-reactive at glass-molding temperatures. For example, the shaping member may be formed from a flexible metallic sheet or foil, such as a nickel-chromium-iron alloy, such as Inconel 600.

The shaping member can have, in various embodiments, a thickness ranging from about 0.1 microns to about 2 mm, such as from about 50 microns to about 1.5 mm, from about 100 microns to about 1 mm, or from about 250 microns to about 500 microns, including all ranges and subranges therebetween. In other embodiments, the shaping member can have a thickness ranging from about 0.1 mm to about 0.5 mm, such as about 0.2 mm to about 0.4 mm, or about 0.3 mm, including all ranges and subranges therebetween. One of skill in the art will be able to choose the appropriate thickness, depending upon the application.

Without wishing to be bound by theory, it is believed that in at least certain embodiments, the addition of the shaping member can improve the heat exchange between the shaping mold and the glass structure to be shaped. As a result, in some embodiments, the temperature of the furnace can be lower due to the improved heat exchange. For instance, the furnace may operate at a temperature as much as about 30° C. lower than that used without the shaping member, or at approximately the same temperature used for conventional gravity bending molds. The shaping member can also function to reduce, eliminate, or substantially eliminate any marks that may otherwise be produced from the discrete ribs forming the collective non-planar surface of the apparatus.

Figure 3:
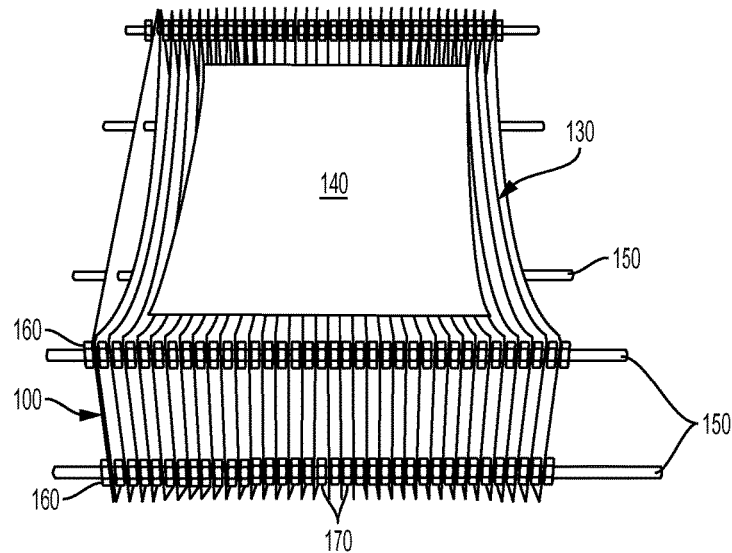
FIG. 3 is an elevated view of an exemplary shaping apparatus according to various embodiments of the disclosure.

The plurality, e.g. array, of rib members 100 can be arranged using one or more support members 150 such that the shaping edges of the rib members collectively form the non-planar surface 130. The support members can extend, for example, in a direction transverse to an axis of the rib members. By way of non-limiting example, and as depicted in FIGS. 2-3, the plurality of rib members may have a vertical axis, and the support members can extend through at least a portion of the voids 110 of one or more rib members 100 or, in some embodiments, through all of the rib members 100, for example in a direction substantially transverse to the vertical axis. In other embodiments, the support members 150 may extend between one or more rib members 100 or guide members 101. For instance, the support members can extend in a direction substantially perpendicular to the vertical axis of the support members.

The support members 150 can be chosen from any structure capable of supporting the shaping apparatus. For instance, the support members may be rods, beams, tubes, or struts of any size, shape, or material. The support members can comprise, for example, metals such as steel and aluminum. The support members can be used for the alignment, registration, and/or spacing of the rib members. By way of non-limiting example, centering rods can be used to align/register the rib members and tie rods or tubes can be used to hold the rib members, and optionally the spacers, in place.

According to various embodiments, one or more of the support members 150 can include a tube with one or more slots or other cutouts, cut at any suitable pitch, which can serve to both align/register the rib members and to space them apart. For instance, the slots can engage at least a portion of the rib members, e.g., the rib members 100 can be slid into place in slots cut along the length of one or more tubes, which can be used to space and/or align the rib members as desired. In further embodiments, the apparatus can comprise a registration means for aligning and/or registering the rib members and/or support members to form the desired non-planar surface. Such means can include, but are not limited to, rods, beams, tubes, struts, and the like, as described herein with respect to the support members, or any other means suitable for the alignment/registration of the apparatus components, such as slats, slots, clips, clamps, and the like.

The support members can be constructed of any material and may, in certain embodiments, be constructed from the same material as the rib members, as discussed above. The support members within a given apparatus can be identical or different in shape. The array of rib members may be arranged such that at least a portion of the voids in the rib members are substantially aligned and the support members can pass through at least a portion of the voids. Each rib member may have a given number of voids and the support members can pass through any number of these voids, wherein the number of support members can vary depending on the desired apparatus shape and the desired amount of support. In some embodiments, various voids in the rib members can be open, e.g., not engaged with a support member, as shown in FIG. 2.

In other embodiments, the support members can pass through only a portion of the rib members, for example, various support members can be used to arrange, align, and/or register various portions of the rib members, but may not pass through voids in all the rib members. In yet further embodiments, the support members can couple to, or engage, at least a portion of the rib members without passing through a void in the rib members, e.g., using one or more slots cut into the support members into which the rib members can be fit. Accordingly, as used herein, the phrase "extending through at least a portion of the plurality of voids" is intended to denote that the support members can extend through each rib member by way of one or more voids, or a portion of the rib members.

The rib members 100 and support members 150 can be optionally secured together using one or more fastening means 160. These fastening members can include, for example, components engaging both members with frictional forces, such as washers, screws, clips, and clamps, to name a few. The rib members can, in various embodiments, be separated by spacers 170. For example, in an embodiment with an array of rib members 100, the spacers can be placed between each rib member in the array, or can be placed between all or a portion of the rib members, as desired to achieve a target glass shape. The spacers can, in certain embodiments, have a thickness ranging from about 0.2 mm to about 50 mm, such as from about 1 mm to about 40 mm, from about 5 mm to about 30 mm, or from about 10 mm to about 20 mm, including all ranges and subranges therebetween. As noted above, spacing of the rib members can also be achieved by using support members, such as tubes, provided with slots or other cutouts. The space between each rib member can be varied to achieve a desired shape, for instance, shapes with irregular profiles or a tight radius.

Figure 4:
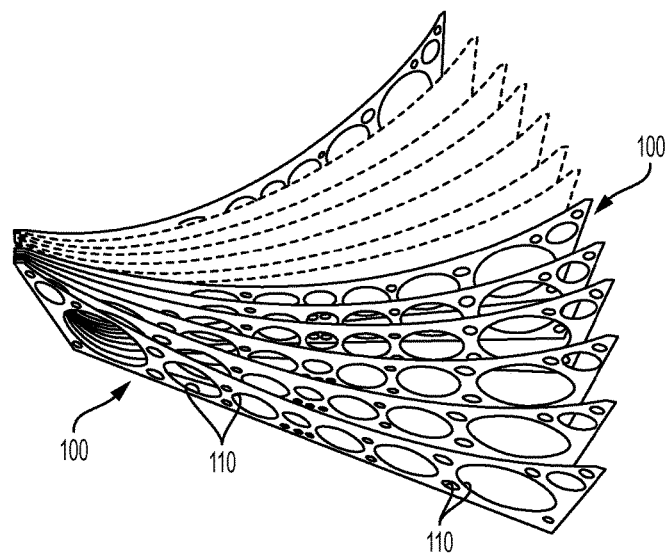
FIG. 4 is an elevated view of an exemplary array of rib members according to various embodiments of the disclosure.

In various embodiments, the rib members may be arranged in an array, i.e. an ordered arrangement. An array of rib members can, for instance, be arranged such that all rib members are substantially parallel, as shown in FIGS. 2-3. According to other embodiments, an array of rib members can be arranged radially, e.g., about a single axis (not shown), as depicted in FIG. 4, or can be formed or arranged about a plurality of radii having, e.g., parallel axes. This exemplary embodiment can be used to form toroidal shapes, e.g., a full toroid or partial toroid, shapes having a non-constant radius, or other desired shapes. Of course, other arrangements can be envisioned to form a variety of glass shapes, such as conical shapes, which can be achieved using, for example, rib members with varying shapes and shaping edges of varying radii, and such a depiction should not limit the scope of the claims appended herewith.

In still further embodiments, the apparatus can comprise two or more arrays of rib members that can be arranged such that at least a portion of the rib members intersect one another, e.g., two arrays can be positioned at one or more angles with respect to each other. For example, a first array of rib members can be arranged in a first direction and a second array of rib members can be arranged in a second direction, e.g., perpendicular to the first direction or at any other angle. The first and second arrays can optionally intersect, for instance, to form a mesh which can make up the non-planar surface. Of course, other arrangements, including different angles and positions for all or part of the rib members are envisioned and intended to fall within the scope of the disclosure.

Figure 5A:
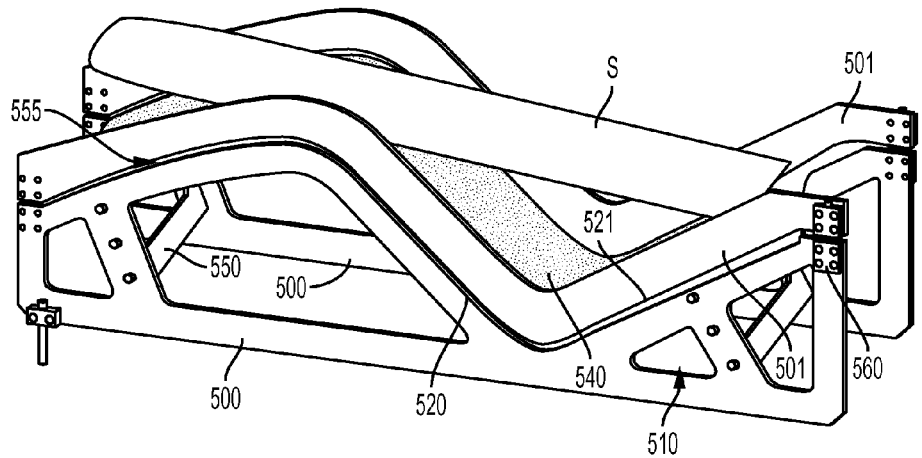
FIG. 5A is a perspective view of a shaping apparatus according to various embodiments of the present disclosure.
Figure 5B:
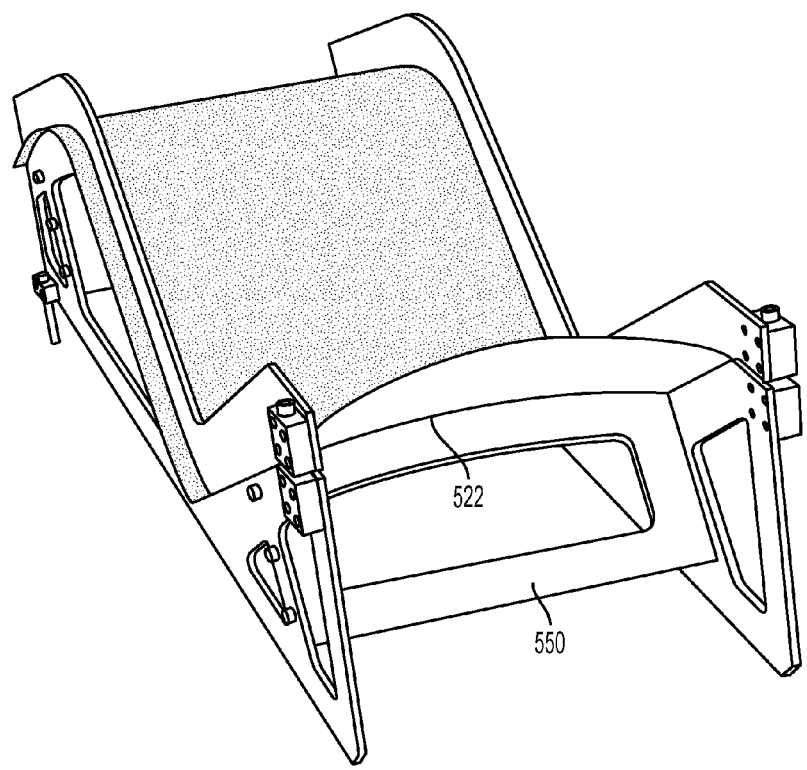
FIG. 5B is another perspective view of the shaping apparatus of FIG. 5A according to various embodiments of the present disclosure.

FIGS. 5A and 5B illustrate perspective views of a further exemplary shaping apparatus configured to shape a glass structure S, according to various embodiments of the disclosure.

Referring to FIG. 5A, the shaping apparatus may include a plurality of rib members 500 comprising at least one shaping edge 520 and at least one void 510; at least one support member 550; and a shaping member 540. As seen in the exemplary embodiment illustrated in FIG. 5A, the shaping apparatus may further comprise at least one guide member 501 comprising a shaping edge 521, optionally configured to substantially match the curvature or shape of shaping edge 520, the guide member 501 optionally connected to at least one rib member 500 by a connecting means 560. In various embodiments, the connecting means may comprise a flexure system connecting the rib member and guide member. In various embodiments, the shaping edges 520 and 521 may define a shaping groove 555 therebetween.

According to various embodiments, at least one rib member 500 and at least one guide member 501 are optionally configured to guide and/or support the shaping member 540. The shaping member 540 may be disposed in or otherwise affixed to one or more shaping grooves 555. A biasing force provided may operate to secure the shaping member 540 in the shaping grooves 555, such that a curvature of the shaping member 540 substantially matches the shape of the shaping grooves 555. The shaping edges 520 and 521, and the shaping groove 555, may, according to at least certain embodiments, have curvatures that are substantially the same. The at least one rib member 500 and at least one guide member 501 and/or the connecting means 560 may be configured so that one or more shaping grooves 555 may bias the support member 540 with respect to one or more shaping edges 520, 521.

Alternatively, one or more shaping grooves 555 may be formed in at least one rib member 500 by any means, such as machining or laser cutting, which may optionally be configured to bias the support member 540 with respect to one or more shaping edges 520, 521.

As shown, the shaping edges 520, 521 and/or shaping grooves 555 may comprise more than one curvature, such as a first curvature and a second curvature, a third curvature, and so on. In various embodiments, the curvature(s) of the shaping member 540 will substantially match one or more curvatures of the shaping edges 520, 521 and/or shaping grooves 555. For example, the lengthwise curvature of the shaping member 540 may match the curvature of the shaping grooves 555. Accordingly, the shaping member 540 may be configured to substantially support the length of the glass structure S during a shaping operation.

The rib members 500 may optionally be configured substantially parallel to one another, radially, or in any other configuration.

The at least one support member 550 may extend between rib members 500 and/or guide members 501, and may be connected to rib members 500 and/or guide members 501 by any connecting means (not shown).

According to some non-limiting embodiments, the exemplary shaping member 540 may have a thickness ranging from about 0.1 mm to about 0.5 mm, such as a thickness of about 0.3 mm. In at least certain embodiments, a thickness of the shaping member 540 of less than 0.1 mm may reduce the strength of the shaping member 540, which may result in sagging or deformation, and a thickness in excess of about 0.5 mm may excessively increase the strength of the shaping member 540, such that it may be difficult to properly shape the shaping member 540 to match the curvature of the shaping grooves 555.

Referring to FIGS. 5A and 5B, according to some embodiments, the support members 550 may include a shaping edge 522. The shaping edge 522 may be curved to impart an additional curvature to the shaping member 540. For example, when the shaping groove 555 imparts a first lengthwise curvature to the shaping member 540, the shaping edge 522 of one or more of the support members 550 may impart a second widthwise curvature to one or more portions of the shaping member 540. Accordingly, the shaping member 540 may be curved in two or three dimensions, so as to be configured to impart a two- or three-dimensional geometry to the glass structure S. However, in other embodiments the shaping edge 522 may be substantially flat, so as not to impart any additional widthwise curvature to the shaping member 540.

The configuration of the shaping apparatus may allow for a contact surface of the shaping member 540, which contacts the glass structure S, to be easily modified. In particular, the contact surface of the shaping member 540 may be modified prior to the shaping member 540 being inserted into the shaping grooves 555 e.g., while the shaping member 540 is in a flat configuration. For example, the shaping member 540 may be easily polished to provide a particular surface roughness, or may be embossed or textured, for example by rolling or stamping, prior to assuming a curved state by being disposed in or otherwise affixed to the shaping groove 555.

The configuration of the shaping apparatus may also allow for the shaping member 540 to be easily replaced, at a low cost, in the case of wearing or degradation, for example.

Figure 6:
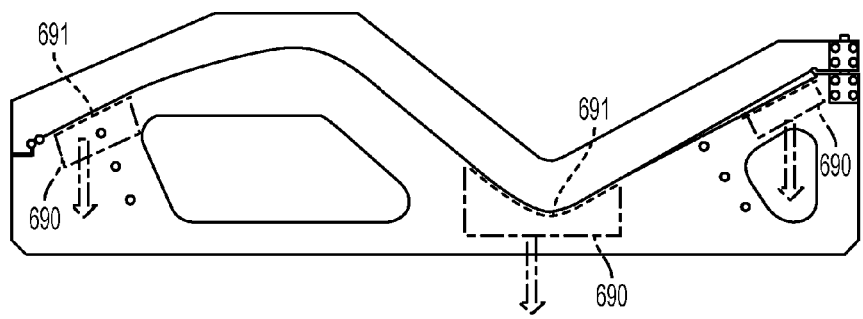
FIG. 6 is a side view of a shaping apparatus according to various embodiments of the present disclosure.

FIG. 6 illustrates a side view of a shaping apparatus according to various embodiments of the present disclosure. The shaping apparatus is similar to the shaping apparatus shown in FIGS. 5A and 5B. Accordingly, only the differences therebetween will be discussed in detail.

Referring to FIG. 6, the shaping apparatus includes vacuum chambers 690. The vacuum chambers 690 may be disposed proximate the shaping apparatus in any location that is suitable to effect vacuum conditions applied to one or more components of the shaping apparatus, such as the shaping member. For example, the vacuum chambers 690 may be adjacent to ends of a glass structure disposed on the shaping apparatus, and/or adjacent to areas of the shaping apparatus that impart a relatively high radius of curvature to the glass structure.

In various embodiments, the shaping member may include through-holes 691 in areas adjacent to the vacuum chambers 690, which may be connected to one or more vacuum sources (not shown). The through-holes 67591 may be any shape and/or dimension, such as, for example, about 0.25 to 1.25 mm in diameter, and may be formed by laser drilling or any other suitable method. The through-holes 691 may allow vacuum conditions formed in the vacuum chambers 690 to be applied to a glass structure through the shaping member. As such, the molding of the glass structure may be more rapidly and/or accurately performed.

Figure 7:
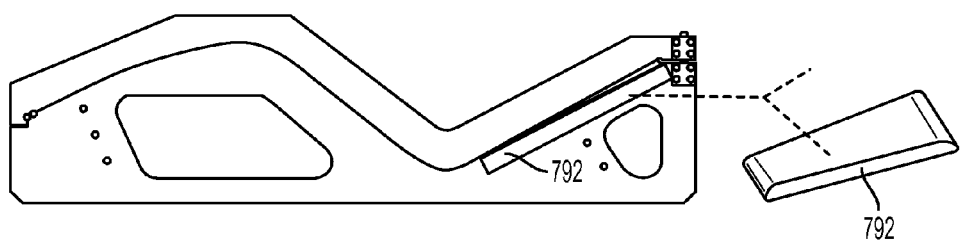
FIG. 7 is a side view of a shaping apparatus according to various embodiments of the present disclosure.

FIG. 7 illustrates a side view of an exemplary shaping apparatus according to various embodiments of the present disclosure. The shaping apparatus is similar to the shaping apparatus shown FIGS. 5A and 5B. Accordingly, only the differences therebetween will be discussed in detail.

Referring to FIG. 7, the shaping apparatus includes a shaping insert 792, which may be disposed below a portion of the shaping member, or may take the place of a corresponding portion of the shaping member. The shaping insert 792 may, in various embodiments, be configured to provide a three-dimensional shape to a corresponding portion of the shaping member, or directly to a portion of a glass structure disposed thereon. The shaping insert 792 may be formed of any of the above-mentioned materials or any other suitable material, and may be formed by any of the above-mentioned methods or by any other suitable method.

The shaping apparatuses according to various embodiments of the disclosure may have one or more advantages such as cost savings, improved precision, accuracy, quality, stability, and/or durability, and/or higher throughput. For example, the shaping apparatus disclosed herein can have a cost similar to that of a rolled metal sheet mold, but can have a precision similar to that of a machined mold. Additionally, by constructing the mold from separate pieces, such as individual rib members and support members, a significant cost savings can be achieved as compared to machining a solid mold from a bulk material. According to various embodiments, the apparatuses disclosed herein can have greater than three times the precision and/or accuracy of rolled steel sheet molds. As compared to, e.g., welded beam molds, the disclosed apparatuses may, in at least certain embodiments, have improved stability and durability over a range of temperatures and periods of time. Furthermore, the apparatuses disclosed herein can have a lighter overall weight according to various embodiments, which can reduce the thermal inertia of the mold, thus allowing for shorter heating cycles and higher throughput. It should be understood that the apparatuses according to the present disclosure may not exhibit one or more of the above advantages, but are still intended to fall within the scope of the disclosure.

Methods

Disclosed herein are methods for shaping a glass structure comprising positioning the glass structure on a shaping apparatus as described herein and heating the glass structure. The glass structure to be shaped may comprise any type of glass material, for example soda lime glass, alkali aluminosilicate glass, alkali containing borosilicate glass and/or alkali aluminoborosilicate glass, such as Corning® Gorilla® glass from Corning Incorporated. The glass structure may by heated by any means, such as, for example, the apparatus with the glass structure to be shaped may be placed in or conveyed through a furnace or other heating means. In certain embodiments, the glass may be heated to a softening point, e.g., a point at which the sheet can be effectively molded into a new shape. According to various embodiments, the glass structure may be heated to a temperature ranging from about 300° C. to about 1600° C., such as from about 500° C. to about 1000° C., or from about 600° C. to about 700° C., including all ranges and subranges therebetween. For instance, the glass structure may be heated in a furnace operating at a temperature ranging from about 500° C. to about 1800° C., such as from about 600° C. to about 1200° C., from about 700° C. to about 1000° C., or from about 800° C. to about 900° C., including all ranges and subranges therebetween.

Upon introduction into the furnace or heating means, the glass structure can be heated for a given time. The heating time may vary depending on the particular system and application. By way of non-limiting example, the heating time may range from about 1 to about 60 minutes or more, such as from about 5 to about 45 minutes, from about 6 to about 30 minutes, from about 12 to about 24 minutes, or from about 15 to about 20 minutes, including all ranges and subranges therebetween. In other embodiments, the heating time may range up to 2 hours, up to 3 hours, up to 4 hours, up to 6 hours, up to 12 hours, up to 24 hours, or more. The heating time may, in various embodiments, be the total amount of residence time of the glass structure in a heating element, such as a furnace, or may be the holding time at the maximum heating temperature, for example. As one of skill will appreciate, the particular heating time and temperature conditions for any particular glass structure will be dependent on relevant variables, including but not limited to, the type and size of glass and the heating equipment (e.g. continuous or static furnace) chosen. After heating, the glass structure may optionally undergo various additional processing steps known to those skilled in the art.

According to various exemplary embodiments, shaping of a glass structure may be facilitated, e.g. during heating, by applying vacuum conditions to portions thereof during heating, such as discussed above with regard to FIG. 6. For example, vacuum conditions may be applied to one or more ends of a shaping member or glass structure and/or to areas of the glass structure that undergo a relatively large amount of bending, e.g., areas in which a high radius of curvature is to be formed.

Figure 8:
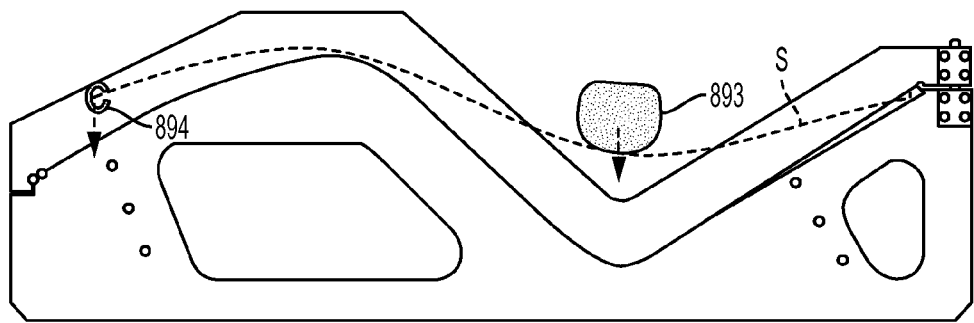
FIG. 8 is a side view of a shaping operation according to various embodiments of the present disclosure.

According to further exemplary embodiments, weight may be applied to a glass structure S during heating. For example, as shown in FIG. 8, a slotted rod-type weight 894 may be applied to an end of a glass structure S that does not contact the shaping apparatus prior to heating. The weight 894 may be formed of any material that is stable e.g., non-reactive, during heating, and capable of effecting the desired application of weight to the glass structure S. For example, the weight 894 may be formed of a metal or metal alloy such as boron nitride.

A dead-load type weight 893 may be applied to a portion of the glass structure S that undergoes a relatively large amount of bending. The weight 893 may be formed of any material that is stable e.g., non-reactive, during heating, is capable of effecting the desired application of weight to the glass structure S, and that does not damage the glass structure S. For example, according to some embodiments, the weight 893 may be formed of a metal foam, such as a stainless steel foam or a nickel foam.

The apparatuses and methods disclosed herein may be used to shape glass structures having various sizes and thicknesses. For example, the methods and apparatuses disclosed herein may be used to shape thin glass structures having a thickness ranging from about 0.1 mm to about 20 mm, such as ranging from about 0.2 mm to about 10 mm, from about 0.5 mm to about 5 mm, from about 0.7 mm to about 3 mm, or from about 1 mm to about 1.5 mm, including all ranges and subranges therebetween. The glass structures provided as described herein may have high accuracy relative to prior art processes, at a fraction of the cost. For example, the apparatuses and methods described may provide accuracy of about +/−0.2 mm over a 1 m long glass structure. Non-limiting exemplary glass structures include, but are not limited to, a single sheet of glass, multiple sheets of glass in a single stack, glass-glass laminate structures, and glass-polymer laminate structures.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a rib member" includes examples having two or more such "rib members" unless the context clearly indicates otherwise. Likewise, a "plurality" or an "array" is intended to denote "more than one." As such, an "array of rib members" includes two or more such rib members, such as three or more such rib members, etc., and a "plurality of support members" includes two or more such support members, such as three or more support members, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. For example, the phrase "from about A to C, such as B," is intended to convey at least the following: "about A to about C," "exactly A to exactly C," "about A to exactly C," "exactly A to about C," "about A to about B," "exactly A to exactly B," "about A to exactly B," "exactly A to about B," "about B to about C," "exactly B to exactly C," "about B to exactly C," "exactly B to about C," "about A," "exactly A," "about B," "exactly B," "about C," and "exactly C."

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

The following Examples are intended to be non-restrictive and illustrative only, with the scope of the invention being defined by the claims.

EXAMPLES

A shaping apparatus according to the instant disclosure was compared to a prior art rolled metal sheet mold of approximately the same size and shape (700 mm×500 mm). Sheets of glass (Corning® Gorilla® glass from Corning Incorporated, 0.7 mm thickness) were placed on each mold and heated in a furnace at various temperatures. The target glass radius was 300 mm. The precision of each mold was measured by subtracting the minimum radius from the maximum radius for each part, based on measurements taken at various locations along the circumference of the part. The accuracy of each mold was measured by calculating the average radius of each part using a best fit model on the various measurement points. The results of these measurements are presented in Table I below.

TABLE I

Accuracy and Precision of Glass Shaping Molds

| Temperature/ Time | Conventional Rolled Metal Mold | | Exemplary Rib Mold | |
| --- | --- | --- | --- | --- |
| | Average radius (mm) | Max radius-min radius (mm) | Average radius (mm) | Max radius-min radius (mm) |
| 670° C./20 min | 317.8 | 0.229 | 303.0 | 0.236 |
| 680° C./20 min | 319.5 | 0.220 | 304.0 | 0.240 |
| 690° C./20 min | 319.2 | 0.282 | 304.4 | 0.279 |
| 700° C./20 min | 319.4 | 0.218 | 304.1 | 0.255 |

As demonstrated in the Table above, shaping molds according to the instant disclosure can have approximately the same precision as a rolled metal sheet mold (about 0.2 mm), while also exhibiting a significantly higher accuracy (within about 1% of target shape as compared to about 6% for the rolled metal sheet mold).

What is claimed is:

1. A glass shaping apparatus comprising:
   a plurality of rib members, one or more rib members comprising at least one void and at least one shaping edge;
   at least one guide member connected to at least one rib member, said at least one guide member comprising at least one shaping edge substantially matching a shape or a curvature of the shaping edge of the at least one rib member;
   at least one support member connecting at least two members of the plurality of rib members and at least one guide member; and
   a shaping member proximate one or more of the shaping edges of the rib members, the shaping member having at least one first curvature that substantially matches at least one first curvature of the shaping edges,
   wherein at least one shaping edge of at least one rib member and at least one shaping edge of at least one guide member are configured to define a shaping groove, and
   wherein the shaping member is disposed in or otherwise affixed to the shaping groove.

2. The apparatus of claim 1 comprising:
   (a) an array of rib members, each of the rib members comprising a plurality of voids and at least one shaping edge; and
   (b) at least one support member extending through at least a portion of at least one void in a direction transverse to a vertical axis of the array of rib members,
   wherein the shaping edges of at least two of the rib members collectively form a non-planar surface.

3. The apparatus of claim 2, wherein the shaping member is disposed on the non-planar surface of the array of rib members, and substantially conforms to the shape of the non-planar surface of the array of rib members.

4. The apparatus of claim 1, wherein the shaping groove is configured to bias the support member with respect to one or more shaping edge of at least one rib member.

5. The apparatus of claim 1, further comprising at least one connector, wherein the at least one connector is configured so that one or more shaping grooves bias the support member with respect to one or more shaping edges of the guide member.

6. The apparatus of claim 1, wherein the rib members comprise metal chosen from steel, stainless steel, cold rolled steel, and aluminium.

7. The apparatus of claim 1, wherein the rib members have a thickness ranging from about 0.1 to about 5 mm.

8. The apparatus of claim 1, wherein the shaping member has a thickness ranging from about 1 micron to about 2 mm.

9. The apparatus of claim 8, wherein the shaping member has a thickness ranging from about 0.1 mm to about 0.5 mm.

10. The apparatus of claim 1, wherein the shaping member comprises metal foils, metal fabrics, glass fabrics, ceramic fabrics, metal papers, glass papers, ceramic papers, and combinations thereof.

11. The apparatus of claim 1, further comprising at least one vacuum chamber configured to apply vacuum conditions to a portion of the shaping member, wherein a portion of the shaping member comprises through-holes.

12. The apparatus of claim 1, wherein at least one of the support members comprises a curved shaping edge configured to impart a second curvature to the shaping member.

13. The apparatus of claim 12, wherein the first curvature and the second curvature extend in substantially perpendicular directions.

14. The apparatus of claim 1, further comprising an insert disposed between the rib members and configured to impart a three-dimensional shape to the shaping member.

15. A method for shaping a glass structure comprising heating a glass structure disposed on a shaping apparatus according to claim 1.

16. The method of claim 15, wherein the heating comprises heating the glass structure to the softening temperature of the glass material.

17. The method of claim 16, wherein the shaping is facilitated by the application of vacuum or weight to the shaping member and/or glass structure.

* * * * *